US007945347B2

(12) United States Patent
Yang

(10) Patent No.: US 7,945,347 B2
(45) Date of Patent: *May 17, 2011

(54) INERTIA COMPENSATED TENSION ROLL IN CLOSED LOOP BELT SYSTEMS

(75) Inventor: Ming Yang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 511 days.

This patent is subject to a terminal disclaimer.

(21) Appl. No.: 12/109,645

(22) Filed: Apr. 25, 2008

(65) Prior Publication Data

US 2008/0283654 A1 Nov. 20, 2008

Related U.S. Application Data

(63) Continuation-in-part of application No. 11/750,370, filed on May 18, 2007, now Pat. No. 7,774,085.

(51) Int. Cl.
*G06F 19/00* (2011.01)

(52) U.S. Cl. ............. 700/126; 700/97; 700/98; 700/122

(58) Field of Classification Search .................. 700/126, 700/97, 98, 122; 242/410, 416; 226/1, 190, 226/195
See application file for complete search history.

(56) References Cited

U.S. PATENT DOCUMENTS

| | | | | |
|---|---|---|---|---|
| 3,659,767 | A | 5/1972 | Martin | |
| 4,218,026 | A | 8/1980 | Stange | |
| 4,265,196 | A * | 5/1981 | Nelson et al. | 118/50 |
| 6,032,004 | A | 2/2000 | Mirabella, Jr. et al. | |
| 6,473,669 | B2 | 10/2002 | Rajala et al. | |
| 7,130,571 | B2 | 10/2006 | Berg et al. | |
| 7,191,973 | B2 | 3/2007 | Gretsch et al. | |
| 7,774,085 | B2 * | 8/2010 | Yang | 700/126 |

OTHER PUBLICATIONS

Xerox, U.S. Appl. No. 11/750,370, Office Action Communication, Dec. 3, 2009, 9 pages.
Reid, K.N. and Lin, Ku-Chin, Dynamic Behavior of Dancer Subsystems in Web Transport Systems, Proceedings of the Second International Conference on Web Handling, p. 135-146, Jun. 6-9, 1993).

* cited by examiner

*Primary Examiner* — Albert Decady
*Assistant Examiner* — Steven R Garland
(74) *Attorney, Agent, or Firm* — Gibb I.P. Law Firm, LLC

(57) ABSTRACT

A printing apparatus, an associated method, and computer program of designing a floating roller in a tensioning system for a closed loop belt comprises inputting an external radius of the floating roller, a measure of elasticity of the belt, a thickness of the belt, a width of the belt, and angles over which the belt contacts the floating roller; and adjusting a mass of the floating roller and a rotational inertia of the floating roller such that the floating roller maintains a constant tension on the closed loop belt.

20 Claims, 4 Drawing Sheets

INERTIA COMPENSATED TENSION ROLL IN CLOSED LOOP BELT SYSTEMS

CROSS-REFERENCE TO RELATED APPLICATIONS

This application is a Continuation-In-Part of U.S. application Ser. No. 11/750,370 filed May 18, 2007, the complete disclosure of which, in its entirety, is herein incorporated by reference.

BACKGROUND AND SUMMARY

Embodiments herein generally relate to rollers used to support and drive closed loop belts within devices such as printing devices and more particularly to inertia compensated roller design.

U.S. Pat. No. 3,659,767 to J. R. Martin (hereinafter referred to as "Martin" and fully incorporated herein by reference) discloses a "dancer" roll used in web transportation. The dancer roll is a roller over which the web passes as it is being transported from a roll (medium source) to another roll. The dancer roll attenuates and insulates motion disturbances form reaching the motion crucial areas of the web. The dancer roll was originally meant to be used in the open loop belt/web transportation (the open loop belt/web system may be simply referred to as a web), but its area of application may be expanded to include closed loop belts. A closed loop belt may be simply referred to as a belt.

More specifically, Martin describes that a recurring problem in systems for performing operations on belt/webs of paper, cloth or other suitable material is the regulation of belt/web tension. Such problems may arise in a number of arts such as printing, film and plastic processing, and magnetic tape recording. In the operation of high speed continuous printing presses the problems of regulating belt/web tension are particularly important. Failure to prevent tension changes in a moving belt/web results in stretching and shrinking of the belt/web along its length. When this occurs in the region in which the belt/web is being imaged, it leads to defects in the printed product such as slurring, doubling and ghosting of images, color mis-registration, and if the tension becomes too great, breaking of the belt/web and interruption of operations.

There are several causes of tension fluctuation in belts/webs. These include variations in the belt/web's modulus of elasticity due to material irregularities or changes in temperature or humidity, rolls which have flat spots or are elliptical in cross section, drifting in the speed of the various drive rolls and the supply roll, irregularities in the operation of braking mechanisms, and the operation of flying pasters which join one supply roll to another while the press is in operation.

A number of means have been developed to regulate or control tension, none of which completely solve the problem of preventing transient changes or fluctuations in tension in one region of the belt/web from causing tension changes in other regions. One approach has been to utilize one or more dancer rolls—floating rotating cylinders each of which, when placed between two rolls and offset therefrom, constrains the belt/web into a loop and exerts force on the bight of the loop. This force, which may be a result of the weight of the dancer or of a force exerted on the dancer by a spring, a fluid pressure actuated cylinder, or an external weight, or some combination thereof, establishes an average level of tension in the loop. It does not, however, completely compensate for changes in belt/web tension on one side of the dancer which usually cause tension changes on the other side of the dancer.

Martin explains that devices have been developed in which the position of a roller, which changes as the belt/web tension changes, is sensed to produce an input signal for a control circuit. The control circuit may be used to adjust another parameter which can affect belt/web tension such as the speed of the supply roll or of drive rolls thus readjusting the belt/web tension to compensate for the initial change and restoring the dancer to its initial position.

In order to address the foregoing issues, embodiments herein comprise an apparatus such as a photoreceptor belt or other belt system in a printing apparatus (e.g., an electrostatographic and a xerographic machine, etc.); an associated method of making a floating roller; and an associated computer program. The apparatus includes a tensioning system having a plurality of rollers. At least one of the rollers (e.g., a drive roller) is adapted to contact, support, and move a closed loop belt, and other rollers (e.g., support rollers or idle rollers) are adapted to freely rotate so as to contact and support the closed loop belt.

A floating roller also freely rotates so as to contact and support the closed loop belt. The floating roller is mounted to rotate and travel along at least one linear path or pivot around some center to move the floating roller center. The drive roller and support rollers are in fixed positions while the floating roller moves relative to the other rollers to maintain the constant tension in the closed loop belt.

The relationship between mass of the floating roller and rotational inertia of the floating roller controls the tensioning system to maintain a constant tension on the closed loop belt. More specifically, the relationship between mass of the floating roller and rotational inertia of the floating is based on the following equation:

$$M \approx \left(1 - \frac{T}{Ebw}\right)\sin^2(\alpha/2)\frac{J}{R^2}$$

where M is the mass of the floating roller, J is the rotational inertia of the floating roller, R is the external radius of the floating roller, E is a Young's modulus of the closed loop belt, b is the thickness of the closed loop belt, w is the width of the closed loop belt, T is the tension force on the closed loop belt and $\alpha$ is an angle (wrap angle) over which the closed loop belt contacts the floating roller.

Similarly, a method embodiment of designing a floating roller in a tensioning system adapted to support a closed loop belt comprises inputting an external radius of the floating roller, a measure of elasticity of the material, a thickness of the material, a width of the material, and angles at which the material contacts the floating roller; and adjusting a mass of the floating roller and a rotational inertia of the floating roller such that the floating roller maintains a constant tension on the closed loop belt as the material is passing through the tensioning system based on the following equation:

$$M \approx \left(1 - \frac{T}{Ebw}\right)\sin^2(\alpha/2)\frac{J}{R^2}$$

where M is the mass of the floating roller, J is the rotational inertia of the floating roller, R is the external radius of the floating roller, E is a Young's modulus of the closed loop belt, b is the thickness of the closed loop belt, w is the width of the closed loop belt, T is the tension force on the closed loop belt and $\alpha$ is an angle (wrap angle) at which the closed loop belt contacts the floating roller.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
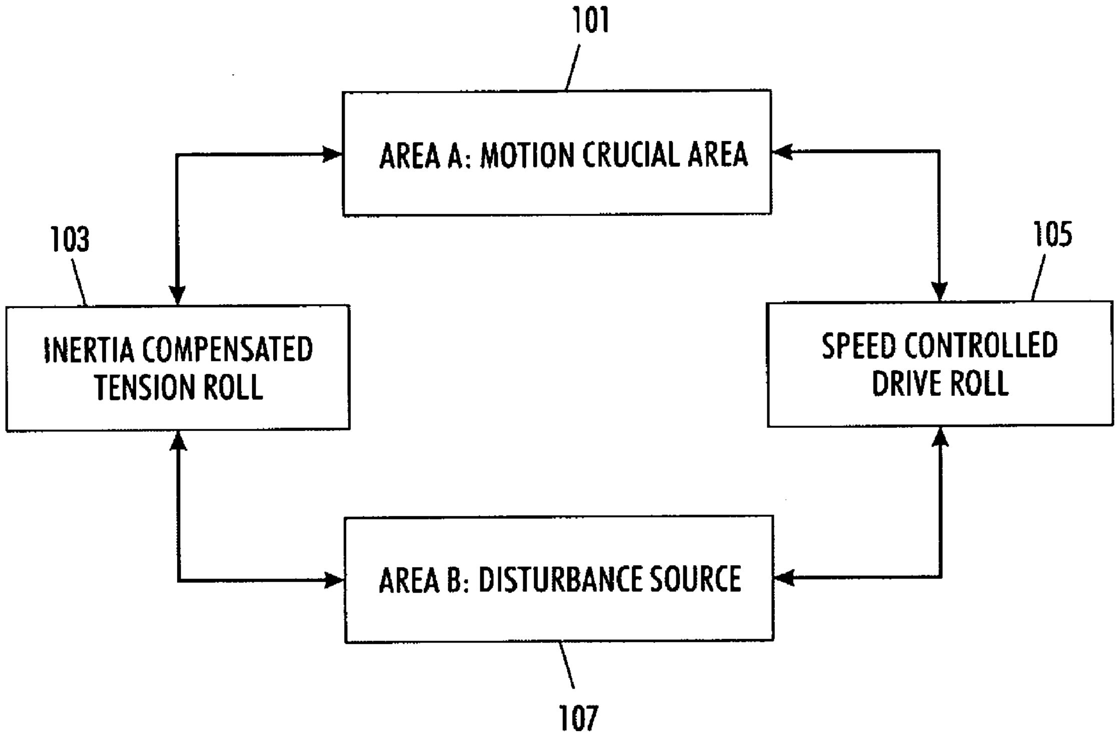
FIG. 1 is a schematic representation of a tensioning apparatus according to embodiments herein.

While the present method and structure will be described in connection with embodiments thereof, it will be understood that this disclosure is not limited to the disclosed embodiments. On the contrary, this disclosure is intended to cover all alternatives, modifications, and equivalents as may be included within the spirit and scope, as defined by the appended claims.

In systems that perform belt transportation supported by rolls, a good dancer design is useful to ensure high motion quality. The dancer system is widely used in belt/web handling to attenuate and insulate disturbance from reaching the motion quality sensitive area such as printing station. Martin's system discussed above provides an inertia-compensated roller that is able to damp disturbance of all frequencies when the belt/web stretch is negligible and when the wrap angle α is 180 degree (see Reid, K. N. and Lin, Ku-Chin, Dynamic Behavior of Dancer Subsystems in Web Transport Systems, Proceedings of the Second International Conference on Web Handling, p 135-146, Jun. 6-9, 1993).

If belt/web stretch is presented, the inertia compensated dancer system still shows remaining disturbance, the remaining disturbance may be as big as, or even bigger than, the input disturbance. Furthermore, the inertia compensated dancer roll design needs to be modified when the belt/web wrap angle on the dancer is not 180 degrees to achieve good dancing effects.

This disclosure enhances such systems as the one presented in Martin by providing an inertia compensated roll design that takes into considerations of the belt stretch and the fact that the wrap angle on the dancer may be not 180 degrees so that motion disturbance of all frequencies may be still damped and insulated from reaching any critical areas, even when the closed loop belt is stretchable and/or the wrap angle on the dancer is not 180 degrees.

The inertia compensated dancer roll design shown in Martin in 1972 was based on an analysis which assumed 1) there was no belt/web stretch; and 2) the belt/web wrap angle at the dancer roll is 180 degrees. Therefore, assume the mass of the dancer roll is $M_2$ and the rotational inertia of the dancer roll is $J_2$ and the external radius of the roll is $R_2$, then Martin's inertia-compensated roll is designed based on the following equation:

$$M_2 = \frac{J_2}{R_2^2} \tag{1}$$

In practice, this usually required some kind of flywheel attached to the dancer. To address the stretch issue, this disclosure presents a dynamic model that includes the belt stretch effects (assuming that the stretch still follows the linear stress and strain relation). More specifically, the dynamic model yields the following equation:

$$M \approx \left(1 - \frac{T}{Ebw}\right)\sin^2(\alpha/2)\frac{J}{R^2} \tag{2}$$

where M is the mass of the floating roller, J is the rotational inertia of the floating roller, R is the external radius of the floating roller, E is a Young's modulus of the closed loop belt, b is the thickness of the closed loop belt, w is the width of the closed loop belt, T is the tension force on the closed loop belt and α is an angle (wrap angle) over which the closed loop belt contacts the floating roller.

More specifically, T is the desired/designed constant tension, which is a design parameter that should be known before any measurement is taken and it should not change in operation. If T needs to be changed, another roll should be designed and manufactured according to the foregoing equation. The equation is therefore used to design the inertia compensating roll (dancer), i.e. to specify the relation between mass and the rotational inertia of the floating roller. With such design specifications, the size (radius, length, thickness, etc.) of the floating roller is adjusted such that the relationship between the mass and the rotational inertial of the floating roller complies with the foregoing equation.

Note the inertia-compensated roll theoretically leaves no disturbance when the "≈" sign is replaced by a true "=" sign. Comparing equation (2) with the Martin design rule of equation (1), it can be seen that the Martin equation is valid only when the belt/web stretch is negligible and the belt/web wrap angle at the dancer roll is exactly 180 degrees. Thus, the embodiments herein completely compensate for all situations even in places where the belt is stretchable and where the wrap angle is different from 180 degrees.

FIG. 1 illustrates a closed loop belt system using schematic boxes. The box 101 represents area A, which is a motion quality crucial area where the motion of the belt 109 must be strictly controlled. Area A 101 can be items such as a developer, transfer or imaging station, etc. within a printing apparatus. Box 107 represents area B that is a disturbance source, such as a belt cleaner. In FIG. 1, the belt 109 moving direction is not important, and the belt 109 can move either clockwise or counter clockwise.

With embodiments herein, the motion crucial area 101 can be positioned between an inertia compensated roll 103 (designed using equation (2)) and a speed controlled drive roll 105 to prevent motion disturbance (107) from reaching the motion crucial area 101. Further, with embodiments herein, the speed controlled drive roll can be kept at constant rotational speed. Also, the tolerances for the idle rollers can be somewhat relaxed; however, the tolerances for the tension roll 103 and the drive roll 105 should be as tight as possible to eliminate motion disturbance.

Figure 2:
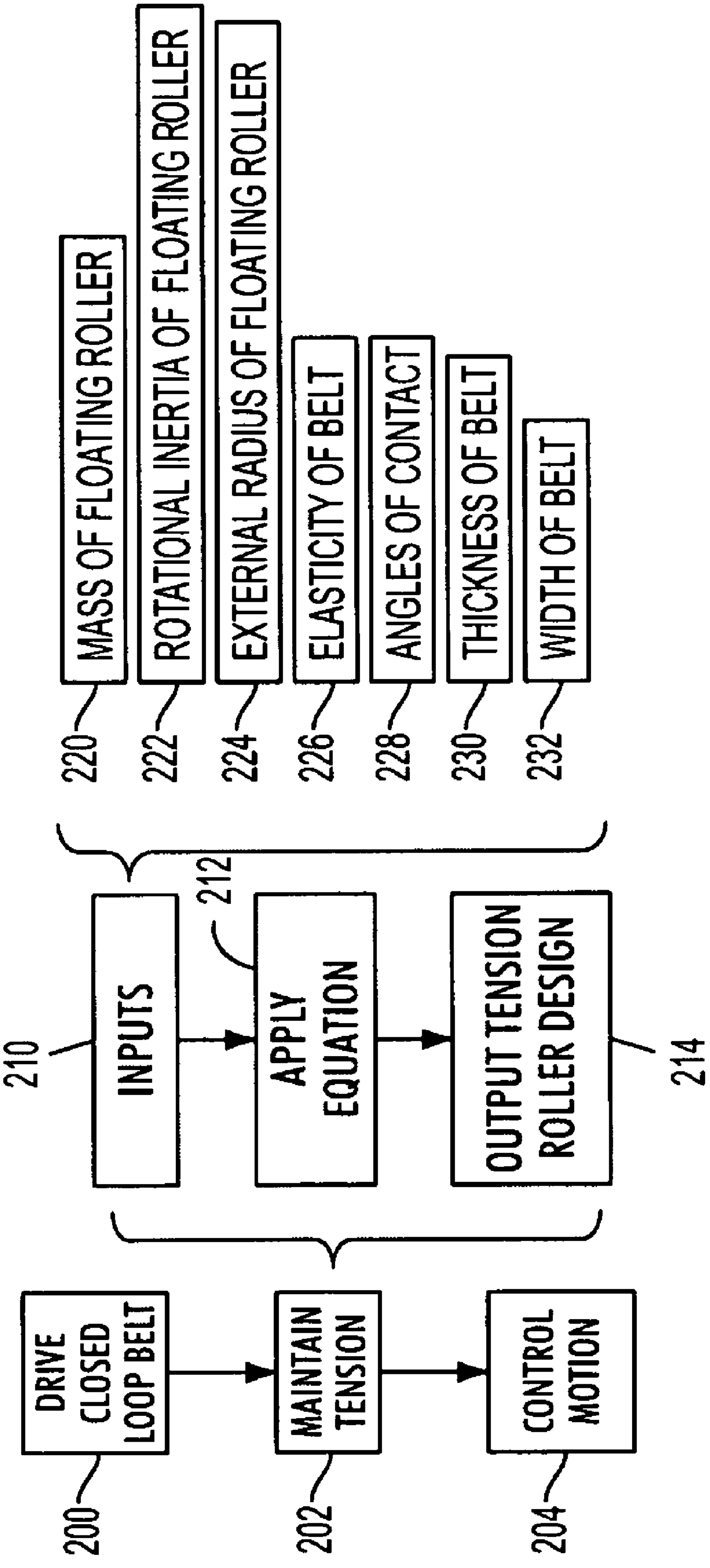
FIG. 2 is a flow diagram illustrating embodiments herein.

The process used to design the tension roller 103 is also shown in flowchart form in FIG. 2, where a closed loop belt (item 200) uses a tensioning system to maintain a constant tension on the closed loop belt (item 202), and the tensioning system controls motion (item 204). The controlling of the tensioning system is based on the design of the floating roller 103. Thus, the design method comprises inputting the various measures described above (item 210), applying the equation (2) discussed above to cause the relationship between mass and rotational inertia of the dancer roller to maintain consistent tension on the closed loop belt (item 212), and outputting the new dancer roller design (item 214).

Such various measures include the mass of the floating roller (item 220), the rotational inertia of the floating roller (item 222), the external radius of the floating roller (item 224), a measure of elasticity of the closed loop belt (item 226), and angles at which the closed loop belt contacts the floating roller (item 228). Other items the design equation is based on include the thickness of the closed loop belt (item 230), and the width of the closed loop belt (item 232).

Figure 3:
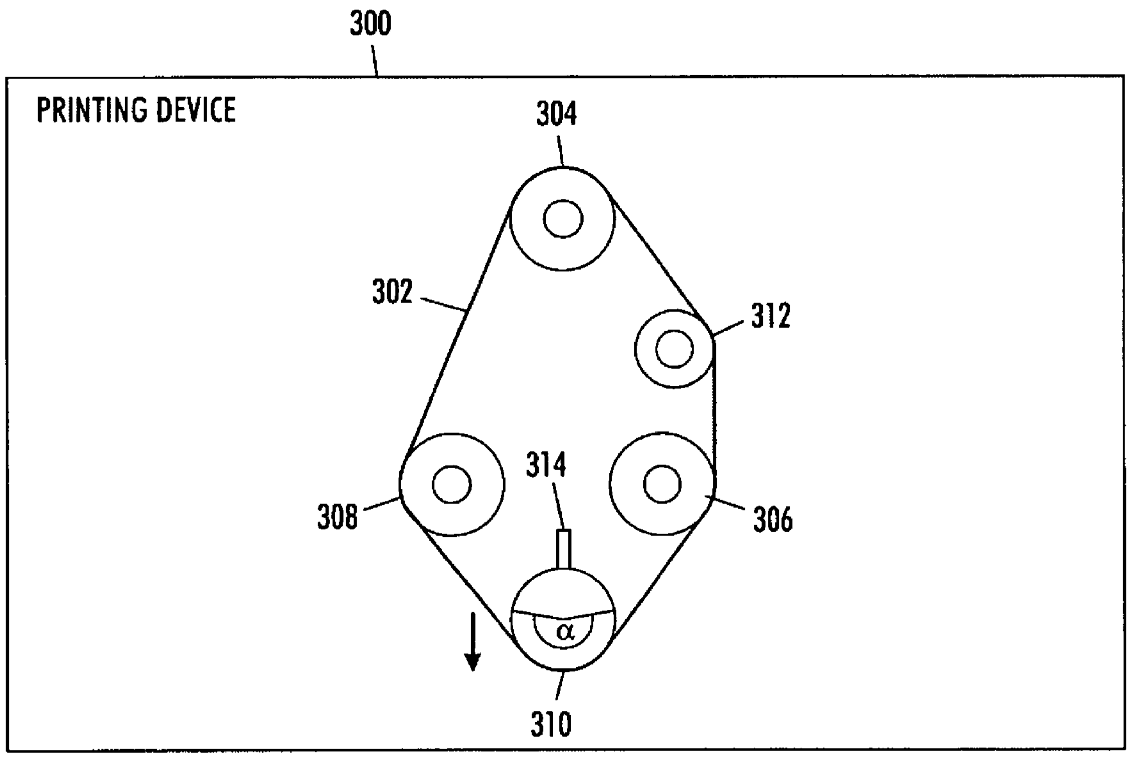
FIG. 3 is a schematic representation of a tensioning apparatus according to embodiments herein.

FIG. 3 is a schematic diagram that illustrates a device 300 (such as a component of a printing device) that can include a closed loop belt 302 that moves in a loop as rollers 304, 306, 308, 310 rotate. The belt 302 can be any type of continuous belt that is used with a device to move items. Thus, the belt 302 is generally flat (has two sides and two edges between the sides), forms a loop, and generally is driven by a drive roller 304. The belt 302 can be a vacuum belt, a magnetic belt, a photoreceptor belt, etc. The roller 306 is a potential area of disturbance (e.g., a cleaning roller) or a relatively high friction source. Roller 308 is an area that needs very tightly controlled belt motion. The structure can also include many idle rollers 312 that are used to route the belt 302 around obstacles.

The dancer roller (floating roller, tension roller) 310 is designed according to equation (2). The relationship between mass and rotational inertia of the floating roller 310 is based on various measures including the external radius of the floating roller 310, a measure of elasticity of the closed loop belt 302, and an angle (wrap angle shown in FIG. 3 as "$\alpha$") over which the closed loop belt 302 contacts the floating roller 310. The angle ($\alpha$) is measured as the radial distance between lines extending from the axis of the floating roller 310 to the points where the closed loop belt 302 first makes contact with the floating roller and where the closed loop belt last makes contact with the floating roller. In other words, if the floating roller 310 circumference covers 360°, the angle ($\alpha$) is the portion (measured in degrees) of that 360° circumference where the closed loop belt 302 contacts the floating roller 310. Other items the design equation (2) is based on include the thickness of the closed loop belt 302, and the width of the closed loop belt 302.

In one embodiment, the design of the floating roller requires the mass of the floating roller and the rotational inertia to be based on the following equation:

$$M \approx \left(1 - \frac{T}{Ebw}\right)\sin^2(\alpha/2)\frac{J}{R^2} \tag{2}$$

where M is the mass of the floating roller 310, J is the rotational inertia of the floating roller 310, R is the external radius of the floating roller 310, E is a Young's modulus of the closed loop belt 302, b is the thickness of the closed loop belt 302, w is the width of the closed loop belt 302, T is the tension force on the closed loop belt 302 and $\alpha$ is an angle (wrap angle) at which the closed loop belt 302 contacts the floating roller 310.

As described in Martin, unlike fixed rollers 304, 306, 308, 312, etc. that are fixed in place and cannot move vertically or horizontally (but can rotate or roll); the dancer roller 310 can not only roll, but can also move (e.g., horizontally, vertically, or any combination of horizontally and vertically).

Further, the dancer roller 310 can be biased (by a biasing member 314, such as a spring, weights, etc.) in a direction (shown, for example, by an arrow in FIG. 3) that will maintain tension on the closed loop belt 302. In other words, the dancer roller 310 is biased to move away from the adjacent fixed rollers 306, 308, so as to apply tension on the closed loop belt 302. See Martin and U.S. Pat. No. 7,191,973 (the complete disclosure of which is incorporated herein by reference) for complete details of biasing devices. Further, as would be understood by those ordinarily skilled in the art, any form of movement apparatus could be used herein to move the compensation roller toward or away from the fixed rollers so as to add or remove tension from the closed loop belt 302.

One ordinarily skilled in the art would understand that the tensioning system could include more rollers or less rollers, there may be more than one tension roller (dancer roller) to insulate either disturbance from difference sources or disturbance from the same source, and FIG. 3 is only one example of many different variations of the embodiments herein. Further, the embodiments can include many other features, such as those disclosed in U.S. Pat. No. 4,218,026 (incorporated herein by reference).

Therefore, embodiments herein use an extended inertia compensated roll (as tension roll) in closed loop belt systems, such as a photoreceptor intermediated belt or any other systems where motion quality of a closed loop belt is critical. The embodiments herein use the inertia compensated roll as the tension roll at one end and a speed controlled driver at another end for a motion quality crucial area. This configuration insulates the motion quality crucial area and prevents most of the motion disturbances from other areas reaching the motion quality crucial area.

The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference.

Figure 4:
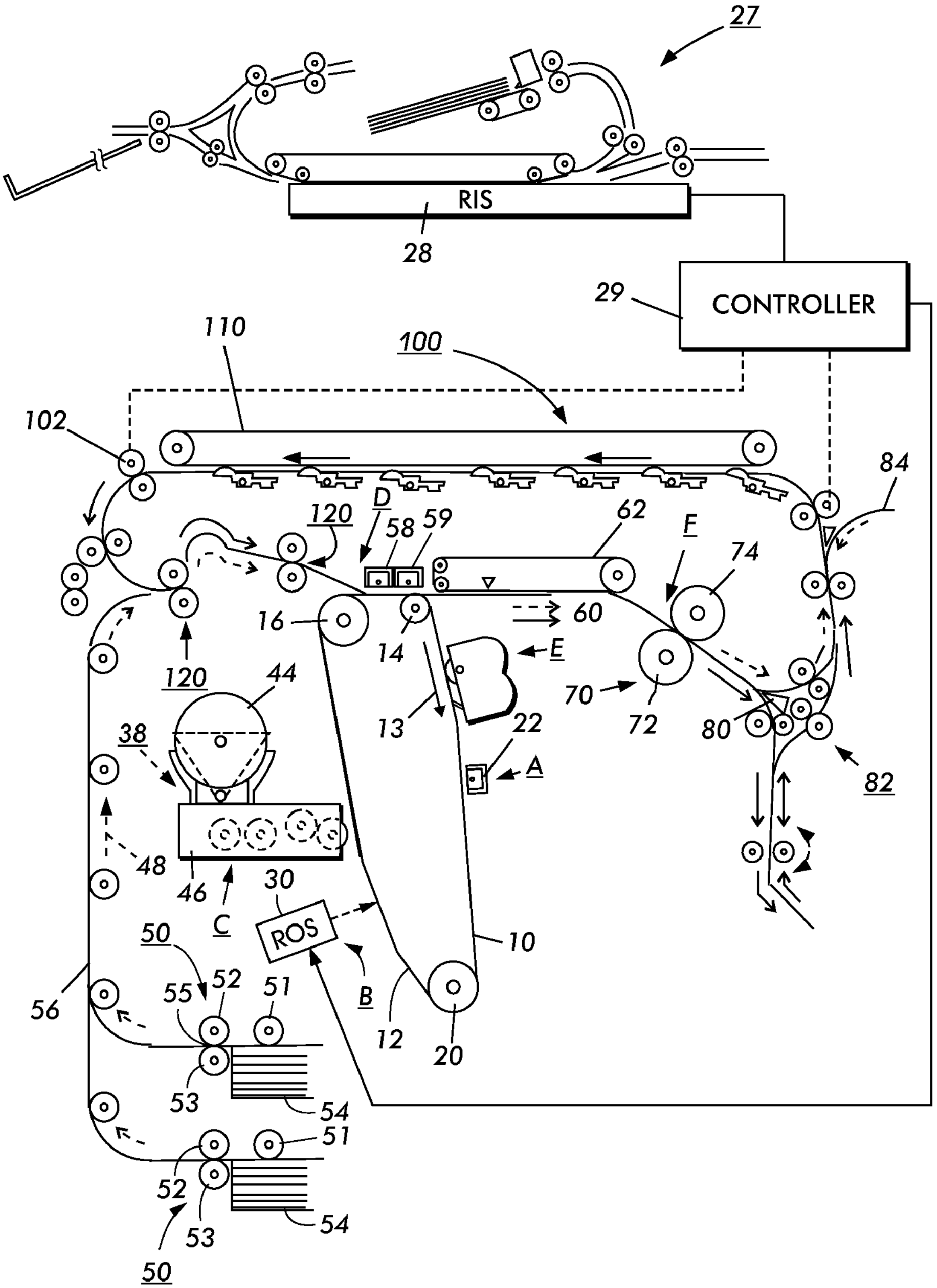
FIG. 4 is a schematic representation of a printing apparatus according to embodiments herein.

For example, FIG. 4 schematically depicts an electrophotographic printing machine that is similar to one described in U.S. Pat. No. 6,032,004. It will become evident from the following discussion that the present embodiments may be employed in a wide variety of devices and is not specifically limited in its application to the particular embodiment depicted in FIG. 4.

Referring to FIG. 4, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

FIG. 4 schematically illustrates an electrophotographic printing machine which generally employs a photoconductive belt 10. The photoconductive belt 10 can be made from a photoconductive material coated on a ground layer, which, in turn, can be coated on an anti-curl backing layer. Belt 10 moves in the direction of arrow 13 to advance successive portions sequentially through the various processing stations disposed about the path of movement thereof. Belt 10 can be entrained about stripping roller 14, tensioning roller 16 and drive roller 20. As roller 20 rotates, it advances belt 10 in the direction of arrow 13. Tensioning roller 16 is designed according to equation (2), can be biased, and provides the same motion control that is discussed above with respect to rollers 103 and 310.

Initially, a portion of the photoconductive surface passes through charging station A. At charging station A, a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or grayscale rendition of the image which can be transmitted to a modulated output generator, for example the raster output scanner (ROS), indicated generally by reference numeral 30. The ESS 29 can be a self-contained, dedicated minicomputer. The image signals transmitted to ESS 29 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 4, after the electrostatic latent image is developed, the toner powder image present on belt 10 advances to transfer station D. A print sheet 48 can be advanced to the transfer station, D, by a sheet feeding apparatus, 50. The sheet feeding apparatus 50 includes a nudger roll 51 which feeds the uppermost sheet of stack 54 to nip 55 formed by feed roll 52 and retard roll 53. Feed roll 52 rotates to advance the sheet from stack 54 into vertical transport 56. Vertical transport 56 directs the advancing sheet 48 of support material into the registration transport 120 of the invention herein, described in detail below, past image transfer station D to receive an image from photoreceptor belt 10 in a timed sequence so that the toner powder image formed thereon contacts the advancing sheet 48 at transfer station D. Transfer station D includes a corona generating device 58 which sprays ions onto the back side of sheet 48. This attracts the toner powder image from photoconductive surface 12 to sheet 48. The sheet is then detacked from the photoreceptor by corona generating device 59 which sprays oppositely charged ions onto the back side of sheet 48 to assist in removing the sheet from the photoreceptor. After transfer, sheet 48 continues to move in the direction of arrow 60 by way of belt transport 62 which advances sheet 48 to fusing station F.

Fusing station F includes a fuser assembly indicated generally by the reference numeral 70 which permanently affixes the transferred toner powder image to the copy sheet. The fuser assembly 70 includes a heated fuser roller 72 and a pressure roller 74 with the powder image on the copy sheet contacting fuser roller 72. The pressure roller is cammed against the fuser roller to provide the necessary pressure to fix the toner powder image to the copy sheet. The fuser roll can be internally heated by a quartz lamp (not shown). Release agent, stored in a reservoir (not shown), can be pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 84 to a finisher or stacker, or deflects the sheet into the duplex path 100, specifically, first into single sheet inverter 82 here. That is, if the sheet is either a simplex sheet, or a completed duplex sheet having both side one and side two images formed thereon, the sheet will be conveyed via gate 80 directly to output 84. However, if the sheet is being duplexed and is then only printed with a side one image, the gate 80 will be positioned to deflect that sheet into the inverter 82 and into the duplex loop path 100, where that sheet will be inverted and then fed to acceleration nip 102 and belt transports 110, for recirculation back through transfer station D and fuser 70 for receiving and permanently fixing the side two image to the backside of that duplex sheet, before it exits via exit path 84.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29. The controller 29 can be a programmable microprocessor which controls all machine functions hereinbefore described. Thus, the controller can comprise a computer-usable data carrier storing instructions that, when executed by the controller (computer), cause the controller to perform the method steps discussed above. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the invention should not be implied or imported from any above example as limitations to any particular order, number, position, size, shape, angle, color, or material.

What is claimed is:

1. A method of designing a floating roller in a tensioning system for a closed loop belt within a processing machine, said method comprising:

inputting an external radius of said floating roller, a measure of elasticity of said closed loop belt, a thickness of said closed loop belt, a width of said closed loop belt, and angles over which said closed loop belt contacts said floating roller; and adjusting a mass of said floating roller and a rotational inertia of said floating roller based on said external radius of said floating roller, said measure of elasticity of said closed loop belt, said thickness of said closed loop belt, said width of said closed loop belt, and said angles over which said closed loop belt contacts said floating roller such that said floating roller maintains a constant tension on said closed loop belt as said closed loop belt is passing through said tensioning system.

2. The method according to claim 1, wherein said adjusting is based on the following equation:

$$M \approx \left(1 - \frac{T}{Ebw}\right)\sin^2(\alpha/2)\frac{J}{R^2}$$

wherein M is said mass of said floating roller, J is said rotational inertia of said floating roller, R is said external radius of said floating roller, E is a Young's modulus of said closed loop belt, b is said thickness of said closed loop belt, w is said width of said closed loop belt, T is said tension force on said closed loop belt and α is an angle over which said closed loop belt contacts said floating roller.

3. The method according to claim 1, wherein said floating roller is adapted to rotate and travel along at least one linear path.

4. The method according to claim 1, wherein said tensioning system comprises rotating rollers in fixed positions adjacent said floating roller, wherein said floating roller moves relative to said rotating rollers to maintain said constant tension on said closed loop belt.

5. The method according to claim 1, wherein said processing machine comprises a printing device.

6. A method of designing a floating roller in a tensioning system for a closed loop photoreceptor belt within a printing device, said method comprising:

inputting an external radius of said floating roller, a measure of elasticity of said closed loop photoreceptor belt, a thickness of said closed loop photoreceptor belt, a width of said closed loop photoreceptor belt, and angles over which said closed loop photoreceptor belt contacts said floating roller; and adjusting a mass of said floating roller and a rotational inertia of said floating roller based on said external radius of said floating roller, said measure of elasticity of said closed loop photoreceptor belt, said thickness of said closed loop photoreceptor belt, said width of said closed loop photoreceptor belt, and said angles over which said closed loop photoreceptor belt contacts said floating roller such that said floating roller maintains a constant tension on said closed loop photoreceptor belt as said closed loop photoreceptor belt is passing through said tensioning system.

7. The method according to claim 6, wherein said adjusting is based on the following equation:

$$M \approx \left(1 - \frac{T}{Ebw}\right)\sin^2(\alpha/2)\frac{J}{R^2}$$

wherein M is said mass of said floating roller, J is said rotational inertia of said floating roller, R is said external radius of said floating roller, E is a Young's modulus of said closed loop photoreceptor belt, b is said thickness of said closed loop photoreceptor belt, w is said width of said closed loop photoreceptor belt, T is said tension force on said closed loop photoreceptor belt and α is an angle at which said closed loop photoreceptor belt contacts said floating roller.

8. The method according to claim 6, wherein said floating roller is adapted to rotate and travel along at least one linear path.

9. The method according to claim 6, wherein said tensioning system comprises rotating rollers in fixed positions adjacent said floating roller, wherein said floating roller moves relative to said rotating rollers to maintain said constant tension on said closed loop photoreceptor belt.

10. The method according to claim 6, wherein said processing machine comprises a printing device.

11. An apparatus comprising:

a closed loop belt; and a tensioning system connected to said closed loop belt, wherein said tensioning system comprises:

at least one drive roller contacting, supporting and moving said closed loop belt;

at least one support roller contacting and supporting said closed loop belt; and a floating roller contacting and supporting said closed loop belt, the floating roller having a physical structure which physically realizes a relationship between mass of said floating roller and rotational inertia of said floating roller to maintain a constant tension on said closed loop belt, and said relationship is based on an external radius of said floating roller, a measure of elasticity of said closed loop belt, a thickness of said closed loop belt, a width of said closed loop belt, and angles over which said closed loop belt contacts said floating roller.

12. The apparatus according to claim 11, wherein said relationship is based on the following equation:

$$M \approx \left(1 - \frac{T}{Ebw}\right)\sin^2(\alpha/2)\frac{J}{R^2}$$

wherein M is said mass of said floating roller, J is said rotational inertia of said floating roller, R is said external radius of said floating roller, E is a Young's modulus of said closed loop belt, b is said thickness of said closed loop photoreceptor belt, w is said width of said closed loop photoreceptor belt, T is said tension force on said closed loop belt and α is an angle at which said closed loop photoreceptor belt contacts said floating roller.

13. The apparatus according to claim 11, wherein said floating roller is mounted to rotate and travel along at least one linear path.

14. The apparatus according to claim 11, wherein said drive roller and said support roller are in a fixed position, wherein said floating roller moves relative to said drive roller and said support roller to maintain said constant tension on said closed loop belt.

15. The apparatus according to claim 11, wherein said processing machine comprises a printing device.

16. A printing apparatus comprising:

a photoreceptor closed loop belt; and a tensioning system connected to said closed loop belt, wherein said tensioning system comprises:

at least one drive roller contacting, supporting and moving said closed loop belt;

at least one support roller contacting and supporting said closed loop belt; and a floating roller contacting and supporting said closed loop belt, the floating roller having a physical structure which physically realizes a relationship between mass of said floating roller and rotational inertia of said floating roller is adapted to control said tensioning system to maintain a constant tension on said closed loop belt, and said relationship is based on an external radius of said floating roller, a measure of elasticity of said closed loop belt, a thickness of said closed loop belt, a width of said closed loop belt, and angles over which said closed loop belt contacts said floating roller.

17. The printing apparatus according to claim 16, wherein said relationship is based on the following equation:

$$M \approx \left(1 - \frac{T}{Ebw}\right)\sin^2(\alpha/2)\frac{J}{R^2}$$

wherein M is said mass of said floating roller, J is said rotational inertia of said floating roller, R is said external radius of said floating roller, E is a Young's modulus of said closed loop photoreceptor belt, b is said thickness of said closed loop photoreceptor belt, w is said width of said closed loop photoreceptor belt, T is said tension force on said closed loop photoreceptor belt and α is an angle at which said closed loop photoreceptor belt contacts said floating roller.

18. The printing apparatus according to claim 16, wherein said floating roller is mounted to rotate and travel along at least one linear path.

19. The printing apparatus according to claim 16, wherein said drive roller and said support roller are in a fixed position, wherein said floating roller moves relative to said drive roller and said support roller to maintain said constant tension on said closed loop belt.

20. The printing apparatus according to claim 16, wherein said printing apparatus comprises one of an electrostatographic and a xerographic printing device.

* * * * *